April 25, 1939.　　　　　K. HELGESON　　　　　2,155,938
TRACTOR WHEEL
Filed March 11, 1938　　　　2 Sheets-Sheet 1

Inventor
Kennell Helgeson
By Clarence A. O'Brien
and Hyman Berman
Attorneys

April 25, 1939.　　　　　K. HELGESON　　　　　2,155,938
TRACTOR WHEEL
Filed March 11, 1938　　　　2 Sheets-Sheet 2
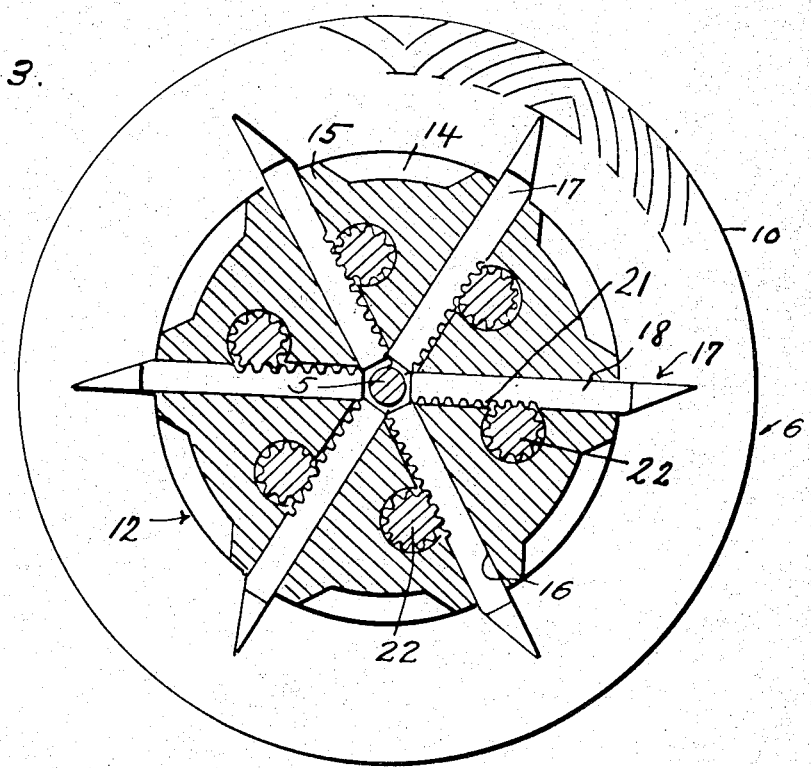
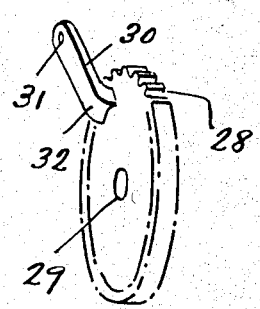
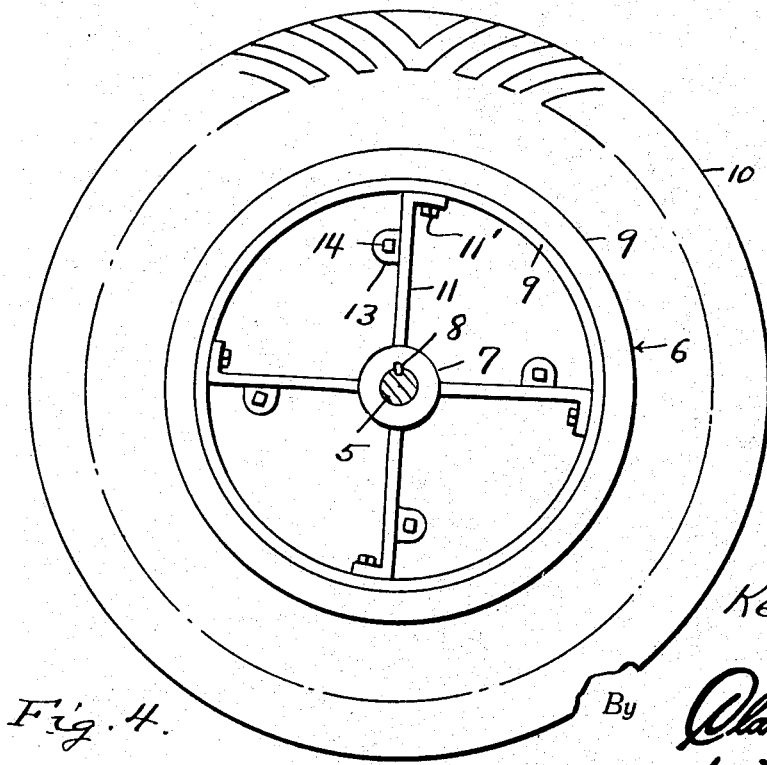
Inventor
Kennell Helgeson
By Clarence A. O'Brien
and Hyman Berman
Attorneys Patented Apr. 25, 1939

2,155,938

UNITED STATES PATENT OFFICE 2,155,938

TRACTOR WHEEL

Kennell Helgeson, Mount Horeb, Wis.

Application March 11, 1938, Serial No. 195,369

4 Claims. (Cl. 301—47)

My invention relates generally to traction wheel units for tractors and the like vehicles, and particularly to a traction unit combining a pneumatic tire and expansible ground engaging elements of substantially rigid character, and an important object of my invention is to provide an efficient and practical combination of these agencies to enable a tractor to be efficiently operated and driven over all types of terrain under different conditions of load and surface and provide a maximum of constant traction.

Other important objects of my invention will be apparent from a reading of the following description taken in connection with the drawings, wherein for purposes of illustration I have shown a preferred embodiment of my invention.

In the drawings:—

Figure 3 is a transverse vertical sectional view taken through Figure 2 approximately on the line 3—3 and looking toward the right in the direction of the arrows.

Figure 4 is a transverse vertical sectional view taken through Figure 2 approximately on the line 4—4 and looking toward the left in the direction of the arrows.

Figure 5 is a perspective view of the operating gear including the operating lever.

Figure 2:
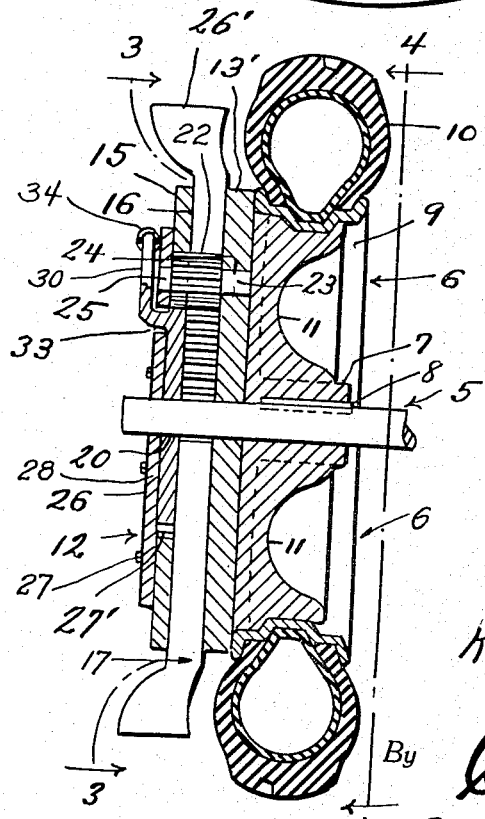
Figure 2 is a transverse vertical sectional view taken through Figure 1 approximately on the line 2—2 and looking toward the left in the direction of the arrows.

Referring in detail to the drawings, and particularly to Figure 2 thereof, the numeral 5 generally designates the powered axle of the tractor or the like vehicle, the numeral 6 generally designates a wheel having a hub 7 keyed as indicated by the numeral 8 on the axle 5 and including a pneumatic tire carrying rim 9 having the pneumatic tire 10 thereon, the rim being supported by a spider composed of the arms 11 bolted as indicated by the numeral 11' to the rim 9 and having ears 13 bolted as indicated by the numeral 14 to the expansible traction element which is generally designated 12. The wheel 6 may be a conventional wheel on the tractor and be attached as indicated to the traction element 12, or the wheel 6 may be a special wheel which will be assembled with the traction element 12 and the two, as a unit, utilized as a replacement for the conventional tractor wheel.

The traction element or unit 12 comprises the annular housing 13' which has arcuate reduced portions 14' at its periphery defining lugs 15 which have openings 16 therein to slidably accommodate the smooth portions 18 (see Fig. 3) of the individual traction arms 17. As shown also in Figure 3 of the drawings the bores or openings 16 are radially arranged and equally circumferentially spaced and terminate at their inner ends adjacent the opening which receives the tractor axle 5 and one side of these arms is provided with teeth in the nature of a rack 21 and these are each in mesh with the teeth of a pinion 10 22 which is mounted on a stub axle 23 having one end or trunnion journaled in the opening 24 (Fig. 1) in the block or housing 13 and having its opposite end or trunnion 25 journaled in the cover plate 26 which is fastened by means of 15 bolts 27 to the open side of the housing 13 to confine the pinions 22 and the arms 17 operatively in place within the housing 13'. The radially outward ends of the arms 17 are widened in a plane parallel to the axis of the unit in a 20 triangular shape having curved sides providing the traction head 26' illustrated in Figure 2 of the drawings, the said head having the generally right triangular cross section illustrated in Figures 1 and 3 of the drawings, with the hypotenuse 25 side thereof adjacent the pinions 22.

Nested in an accommodating opening 27' in the housing or block 13' is a driving gear which is generally designated 28 (Fig. 5) and which has an opening 29 (Fig. 5) rotatably receiving the 30 axle 5 and provided with a radially projecting operating lever 30 which has a spring attaching opening 31 at its radially outward end. The arm 30 is offset as indicated by the numeral 32 and passes through an accommodating arcuate slot 35 33 in the cover plate 26. When the lever or arm 30 is swung toward the left in Figure 1 of the drawings to the opposite end of the slot 33 from the position in which it is shown, the effect is to rotate the operating gear 28, thereby turning 40 the respective pinions 22 and thereby feeding the arms or rods 17 in a radially outward direction for engagement with the ground.

Figure 1:
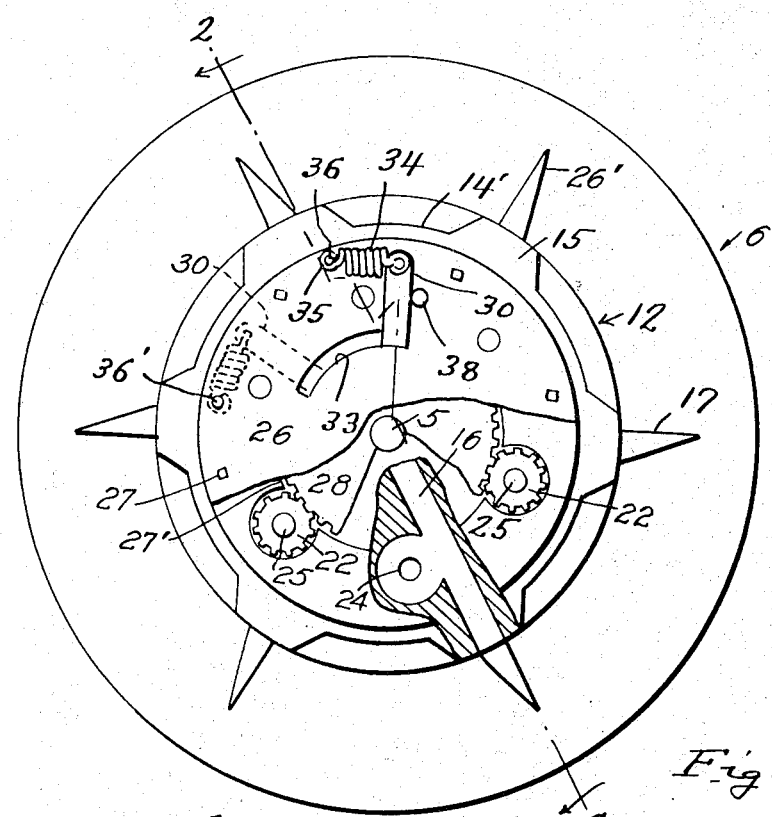
Figure 1 is an outboard elevational view of an embodiment of the invention.

A helical spring 34 has one end attached to the opening equipped end of the arm 30 and has 45 an eye 35 at its opposite end for engagement with a lug 36 on the cover plate whereby the arm is held in the inoperative position shown in Figure 1 of the drawings. In the operative position of the arm at the opposite end of the slot 33 the eye 50 35 is attached to the lug 36' whereby the arm and hence the rods or arms 17 are held in the radially outwardly projected positions. The spring 34 acts as a shock absorber. The lug 38 is a stop.

Although I have shown and described herein a preferred embodiment of my invention, it is to be definitely understood that I do not desire to limit the application of the invention thereto, and any change or changes may be made in the materials and in the structure and arrangement of the parts, within the spirit of the invention and the scope of the subjoined claims.

Having described the invention, what is claimed as new is:

1. A traction unit for a tractor or the like having an axle, said unit comprising a tire-rim-equipped wheel keyed to said axle and including a pneumatic tire on the rim, said wheel including a spider, a block attached to said spider at one side of said wheel and concentric therewith, said block containing radial openings, traction rods disposed slidably in said openings, each rod having a rack portion, an individual pinion rotatably mounted in said block and meshed with the rack of the corresponding rod, and a driving gear rotatably mounted on said block and meshed with all of said pinions, and means for rotatably positioning said gear for effecting a retracted or a projected position of said rods.

2. A traction unit for a tractor or the like having an axle, said unit comprising a tire-rim-equipped wheel keyed to said axle and including a pneumatic tire on the rim, said wheel including a spider, a block attached to said spider at one side of said wheel and concentric therewith, said block containing radial openings, traction rods disposed slidably in said openings, each rod having a rack portion, an individual pinion rotatably mounted in said block and meshed with the rack of the corresponding rod, and a driving gear rotatably mounted on said block and meshed with all of said pinions, and means for rotatably positioning said gear for effecting a retracted or a projected position of said rods, and shock absorbing means extending between the last-mentioned means and a part of the block for holding the gear in a predetermined position.

3. A traction unit for a tractor having an axle, said unit comprising a pneumatic-tire-equipped wheel keyed on said axle, said wheel including a spider, a traction element mounted on said axle and attached to said spider, said element comprising a block including radial circumferentially spaced passages, an extensible and retractible rigid arm slidably contained in each passage, and means for simultaneously retracting or projecting said arms, said means comprising individual pinions, a gear meshed with all of said pinions, and individual racks on the arms in mesh with the pinions.

4. A traction unit for a tractor having an axle, said unit comprising a pneumatic-tire-equipped wheel keyed on said axle, said wheel including a spider, a traction element mounted on said axle and attached to said spider, said element comprising a block including radial circumferentially spaced passages, extensible and retractible rigid arms slidably contained said passages, and means for simultaneously retracting or projecting said arms, said means comprising individual pinions, a gear meshed with all of said pinions, and individual racks on the arms in mesh with the pinions, and yieldable means connected between a part of said block and a part of said gear for yieldably holding the gear in arm projecting or retracting positions.

KENNELL HELGESON.